(12) United States Patent
Kolovson

(10) Patent No.: US 8,127,088 B2
(45) Date of Patent: Feb. 28, 2012

(54) INTELLIGENT CACHE MANAGEMENT

(75) Inventor: Curt Kolovson, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1689 days.

(21) Appl. No.: 11/044,962

(22) Filed: Jan. 27, 2005

(65) Prior Publication Data

US 2006/0168403 A1 Jul. 27, 2006

(51) Int. Cl.
*G06F 12/00* (2006.01)
*G06F 13/00* (2006.01)
*G06F 13/28* (2006.01)

(52) U.S. Cl. ........................................ 711/154
(58) Field of Classification Search .................. 711/141
See application file for complete search history.

(56) References Cited

U.S. PATENT DOCUMENTS

| | | | | |
|---|---|---|---|---|
| 5,706,467 A * | 1/1998 | Vishlitzky et al. | ............ | 711/129 |
| 5,848,241 A * | 12/1998 | Misinai et al. | ................ | 709/213 |
| 5,915,262 A * | 6/1999 | Bridgers et al. | ............. | 711/143 |
| 5,923,876 A | 7/1999 | Teague | | |
| 6,145,006 A * | 11/2000 | Vishlitsky et al. | ............ | 709/229 |
| 6,161,192 A | 12/2000 | Lubbers | | |
| 6,170,063 B1 | 1/2001 | Golding | | |
| 6,295,578 B1 | 9/2001 | Dimitroff | | |
| 6,397,293 B2 | 5/2002 | Shrader | | |
| 6,487,636 B1 | 11/2002 | Dolphin | | |
| 6,490,122 B1 | 12/2002 | Holmquist | | |
| 6,493,656 B1 | 12/2002 | Houston | | |
| 6,505,268 B1 | 1/2003 | Schultz | | |
| 6,523,749 B2 | 2/2003 | Reasoner | | |
| 6,546,459 B2 | 4/2003 | Rust | | |
| 6,560,673 B2 | 5/2003 | Elliott | | |
| 6,587,962 B1 | 7/2003 | Hepner | | |
| 6,594,745 B2 | 7/2003 | Grover | | |
| 6,601,187 B1 | 7/2003 | Sicola | | |
| 6,606,690 B2 | 8/2003 | Padovano | | |
| 6,609,145 B1 | 8/2003 | Thompson | | |
| 6,629,108 B2 | 9/2003 | Frey | | |
| 6,629,273 B1 | 9/2003 | Patterson | | |
| 6,643,795 B1 | 11/2003 | Sicola | | |
| 6,647,514 B1 | 11/2003 | Umberger | | |
| 6,658,590 B1 | 12/2003 | Sicola | | |
| 6,663,003 B2 | 12/2003 | Johnson | | |
| 6,681,308 B1 | 1/2004 | Dallmann | | |
| 6,708,285 B2 | 3/2004 | Oldfield | | |
| 6,715,101 B2 | 3/2004 | Oldfield | | |
| 6,718,404 B2 | 4/2004 | Reuter | | |
| 6,718,434 B2 | 4/2004 | Veitch | | |
| 6,721,847 B2 * | 4/2004 | Hursey | ........................ | 711/118 |
| 6,721,902 B1 | 4/2004 | Cochran | | |

(Continued)

OTHER PUBLICATIONS

Patterson, R. Hugo, Informed Prefetching and Caching, Proc. of the 15th ACM Symp. on Operating System Principles, Dec. 1995.

*Primary Examiner* — Kevin Ellis
*Assistant Examiner* — Gary W Cygiel

(57) ABSTRACT

An exemplary storage network, storage controller, and methods of operation are disclosed. In one embodiment, a method of managing cache memory in a storage controller comprises receiving, at the storage controller, a cache hint generated by an application executing on a remote processor, wherein the cache hint identifies a memory block managed by the storage controller, and managing a cache memory operation for data associated with the memory block in response to the cache hint received by the storage controller.

25 Claims, 9 Drawing Sheets

U.S. PATENT DOCUMENTS

| | | |
|---|---|---|
| 6,725,393 B1 | 4/2004 | Pellegrino |
| 6,742,020 B1 | 5/2004 | Dimitroff |
| 6,745,207 B2 | 6/2004 | Reuter |
| 6,763,409 B1 | 7/2004 | Elliott |
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,839,824 B2 | 1/2005 | Camble |
| 6,842,833 B1 | 1/2005 | Phillips |
| 6,845,403 B2 | 1/2005 | Chadalapaka |
| 7,234,019 B1 * | 6/2007 | Kao et al. ............... 711/5 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236952 A1 | 12/2003 | Grieff |
| 2003/0236953 A1 | 12/2003 | Grieff |
| 2004/0019740 A1 | 1/2004 | Nakayama |
| 2004/0022546 A1 | 2/2004 | Cochran |
| 2004/0024838 A1 | 2/2004 | Cochran |
| 2004/0024870 A1 | 2/2004 | Hirata |
| 2004/0024961 A1 | 2/2004 | Cochran |
| 2004/0034745 A1 | 2/2004 | Hameed |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0230859 A1 | 11/2004 | Cochran |
| 2004/0267959 A1 | 12/2004 | Cochran |

* cited by examiner

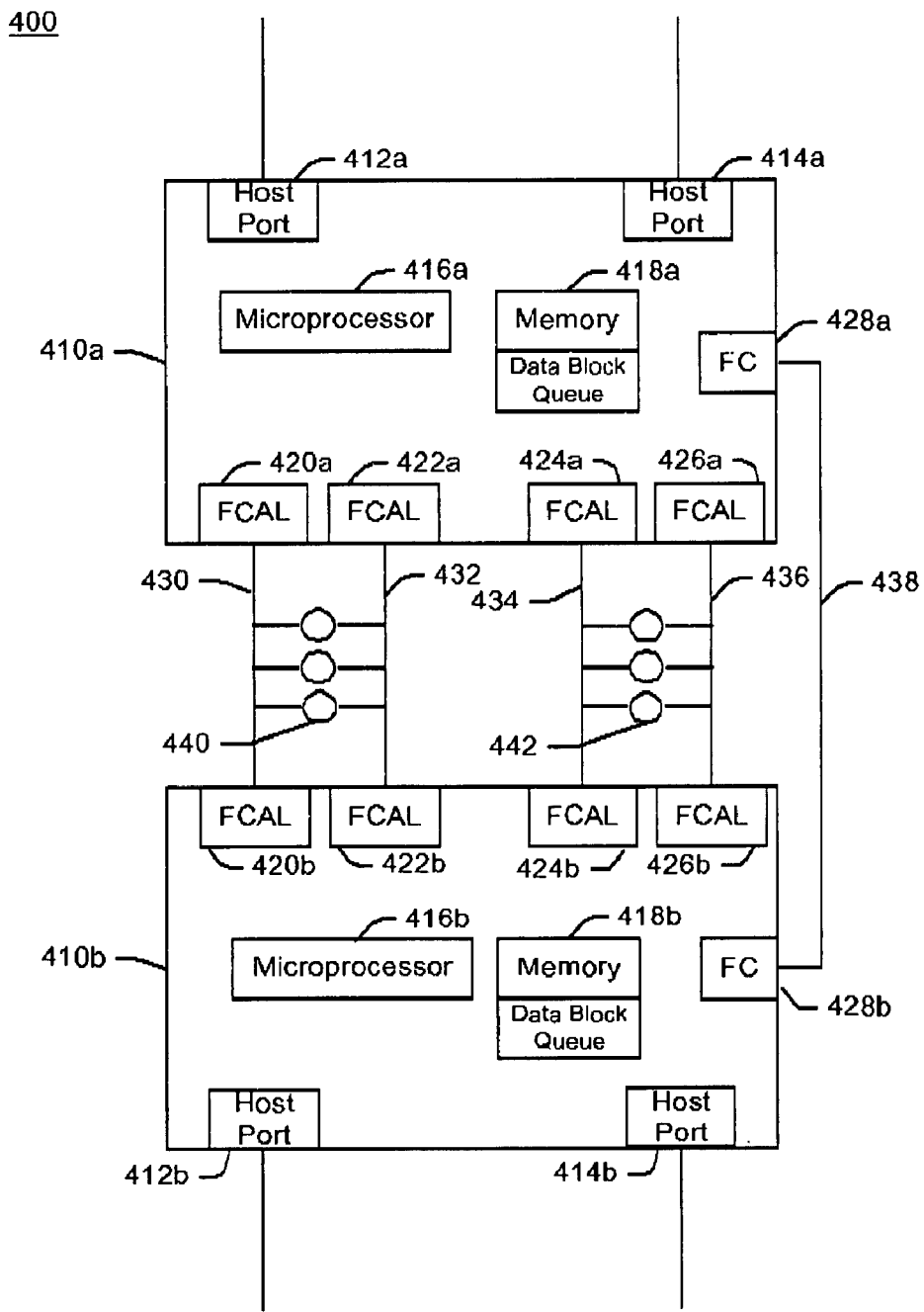
Fig. 4
(Amended)

INTELLIGENT CACHE MANAGEMENT

TECHNICAL FIELD

The described subject matter relates to electronic computing, and more particularly to systems and methods for intelligent cache management.

BACKGROUND

Effective collection, management, and control of information have become a central component of modern business processes. To this end, many businesses, both large and small, now implement computer-based information management systems.

Data management is an important component of a computer-based information management system. Many users implement storage networks to manage data operations in computer-based information management systems. Storage networks have evolved in computing power and complexity to provide highly reliable, managed storage solutions that may be distributed across a wide geographic area.

In use, various operations are executed against data resident in memory in a storage system. Many storage systems retrieve data that is actively being modified from a permanent storage media and place the data in a cache memory to enhance the speed of executing data operations. Cache memory is a limited resource, and adroit management of cache memory is desirable.

SUMMARY

In one embodiment, a method of managing cache memory in a storage controller comprises receiving, at the storage controller, a cache hint generated by an application executing on a remote processor, wherein the cache hint identifies a memory block managed by the storage controller, and managing a cache memory operation for data associated with the memory block in response to the cache hint received by the storage controller.

BRIEF DESCRIPTION OF THE DRAWINGS

FIG. 4 is a schematic illustration of an exemplary implementation of a storage cell.

DETAILED DESCRIPTION

Described herein are exemplary storage network architectures and methods for intelligent cache management. The methods described herein may be embodied as logic instructions on a computer-readable medium such as, e.g., firmware executable on a processor. When executed on a processor, the logic instructions cause processor to be programmed as a special-purpose machine that implements the described methods.

Exemplary Network Architecture

Figure 1:
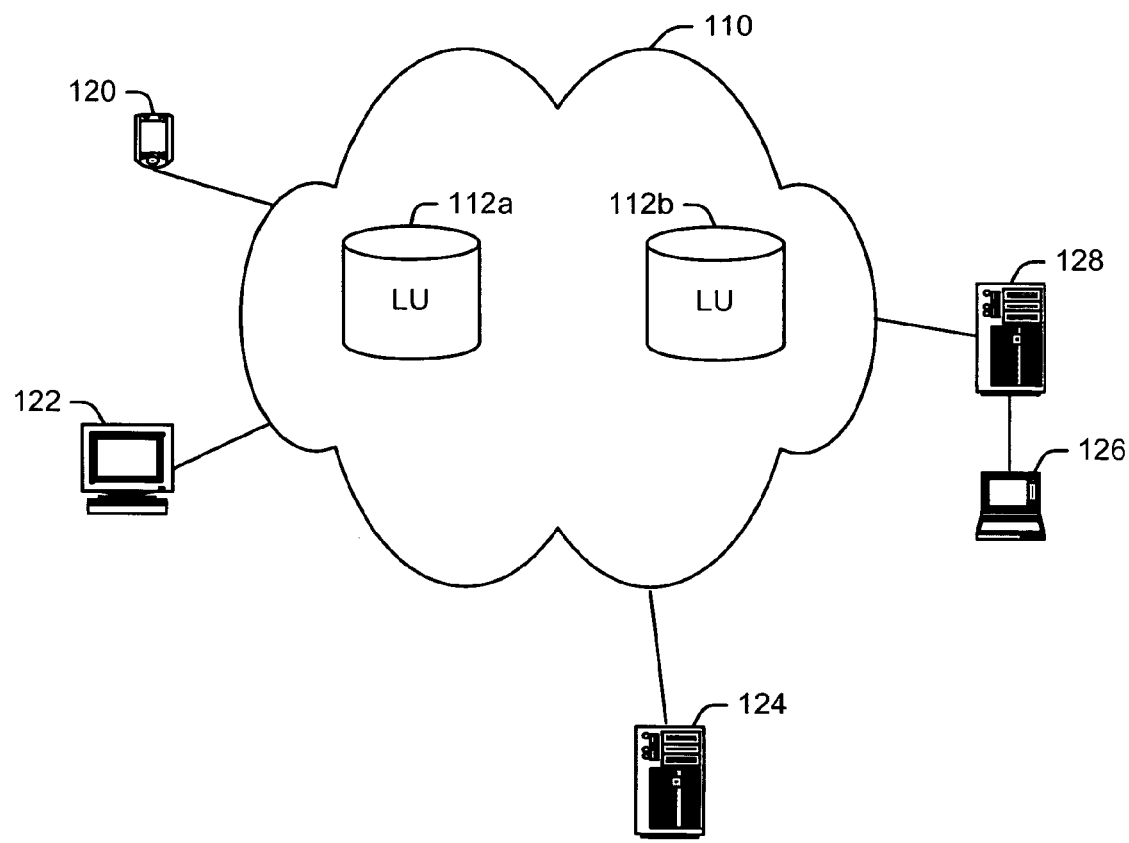
FIG. 1 is a schematic illustration of an exemplary implementation of a networked computing system that utilizes a storage network.

FIG. 1 is a schematic illustration of an exemplary implementation of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUs) 112a, 112b may be allocated within storage pool 110. Each LU 112a, 112b comprises a contiguous range of logical addresses that can be addressed by host devices 120, 122, 124 and 128 by mapping requests from the connection protocol used by the host device to the uniquely identified LU 112. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which are also hosts, may logically couple directly to LUs 112a, 112b. Hosts 120-128 may couple to multiple LUs 112a, 112b, and LUs 112a, 112b may be shared among multiple hosts. Each of the devices shown in FIG. 1 may include memory, mass storage, and a degree of data processing capability sufficient to manage a network connection.

Figure 2:
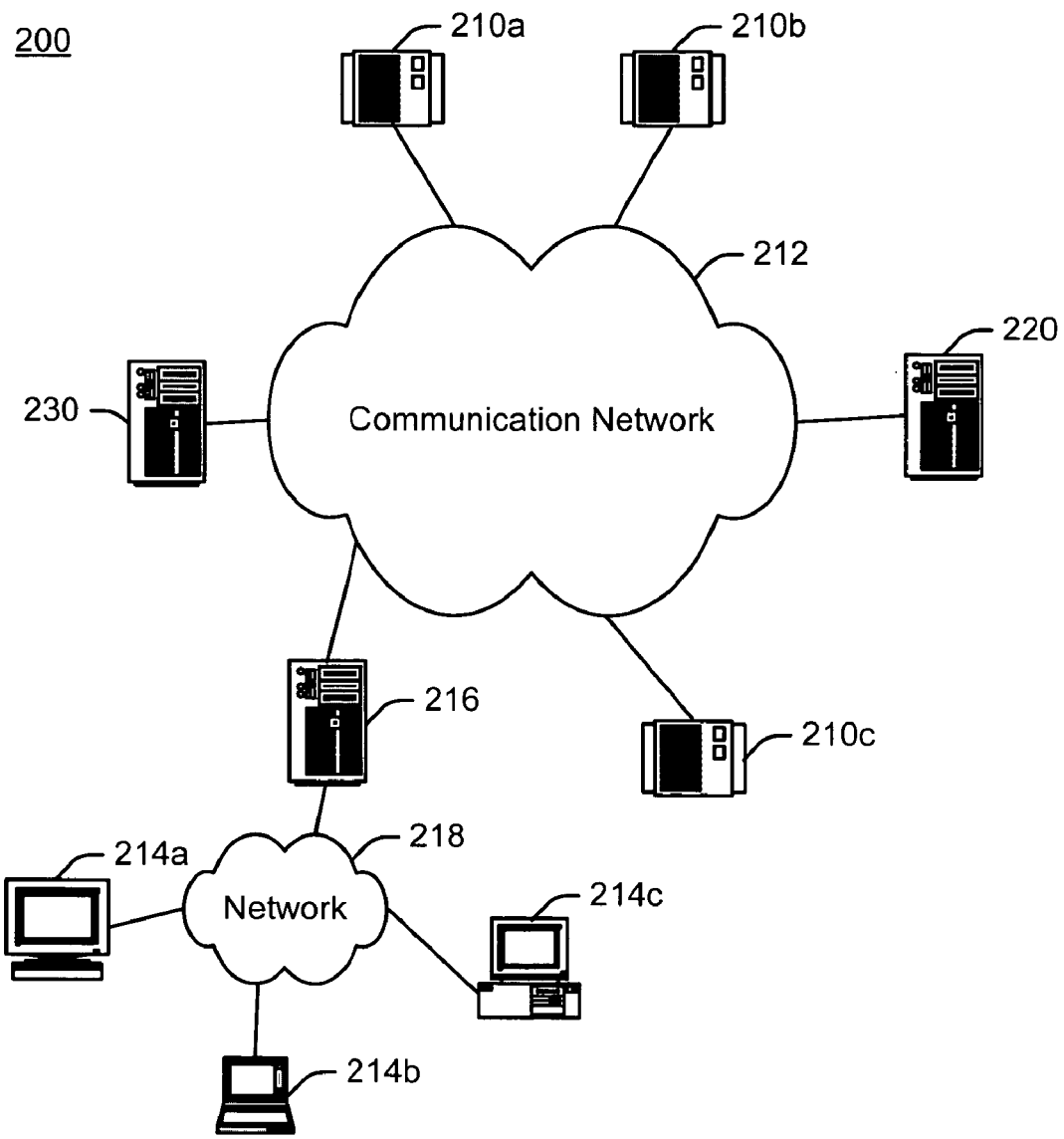
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available from Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220, 230. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. A switching fabric comprising a single FC switch can interconnect 256 or more ports, providing a possibility of hundreds of storage cells 210a, 210b, 210c in a single storage network.

Figure 3:
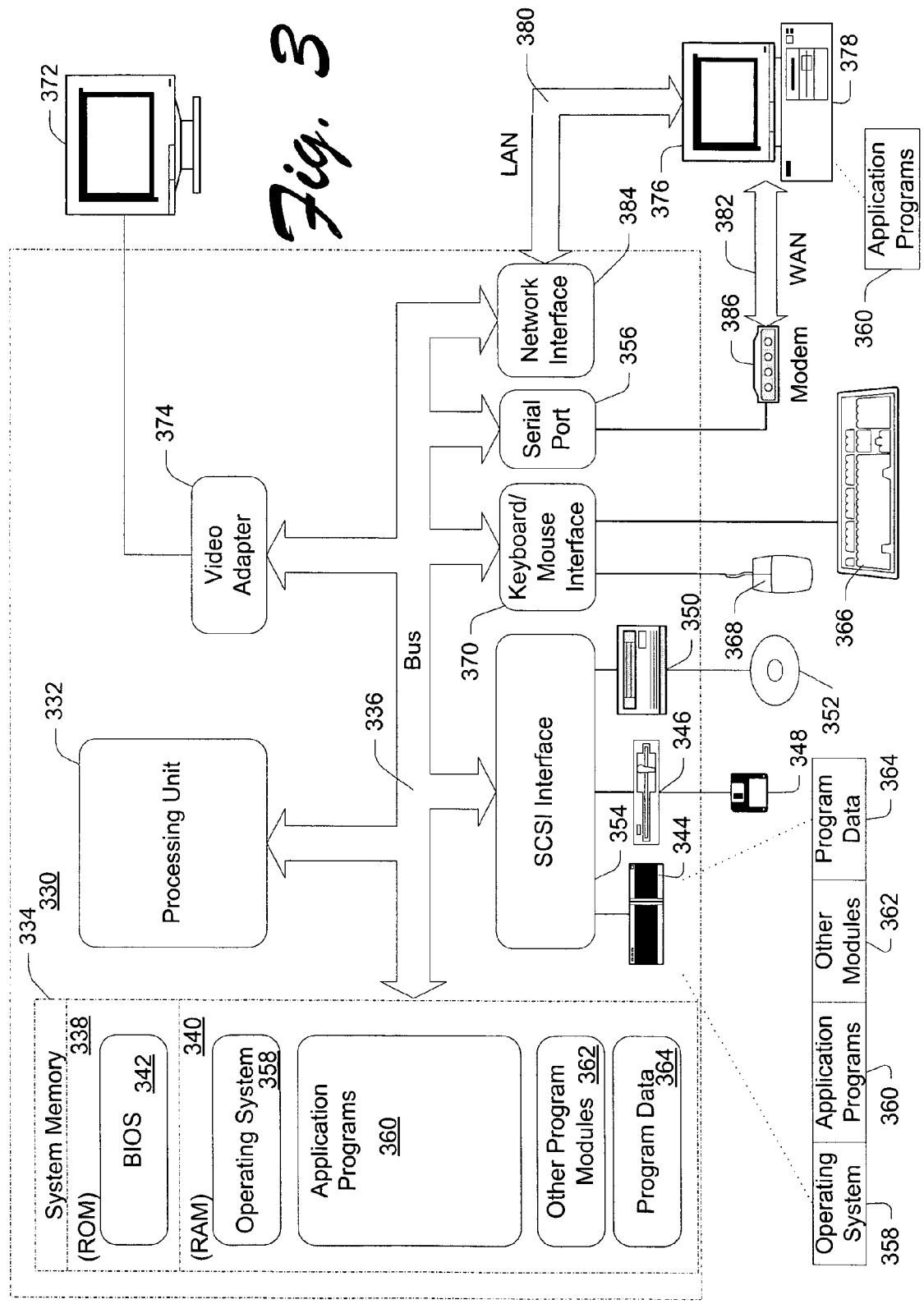
FIG. 3 is a schematic illustration of an exemplary implementation of a computing device that can be utilized to implement a host.

Hundreds or even thousands of host computers 216, 220 may connect to storage network 200 to access data stored in storage cells 210a, 210b, 210c. Hosts 216, 220 may be embodied as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems distributed, for example, on floppy disks, CD-ROMs, or electronically, and are installed or loaded into the secondary memory of a computer. At execution, the programs are loaded at least partially into the computer's primary electronic memory.

FIG. 4 is a schematic illustration of an exemplary implementation of a storage cell 400, such as storage cell 210. Referring to FIG. 4, storage cell 400 includes two Network Storage Controllers (NSCs), also referred to as disk controllers or array controllers, 410a, 410b to manage the operations and the transfer of data to and from one or more disk arrays 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell 210.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric may be used.

Exemplary Operations

Having described various components of an exemplary storage network, attention is now directed to operations of the storage network 200 and components thereof.

In operation, application software executing on one or more client computing devices such as computing device 126 perform functions that generate requests which are directed to a host computer such as host computer 128. In response to the request(s), the host computer 128 transmits a data request to a component of the storage network 200. Typically, the request is transmitted to one or more NSC such as NSC 410a, 410b, which executes the data operation against data on a disk. The NSC may retrieve data from storage on permanent media such as one or more of the disks 440, 442 into cache memory such as memory 418a, 418b.

To facilitate efficient management of cache memory resources, a controller may be configured to receive cache management hints generated by higher-level software applications and to manage the cache resource in response to the received cache management hints. In one implementation, a cache management hint may be embodied as a message that provides a suggestion to the NSC such as NSC 410a, 410b regarding how the data passed by the application should be managed in cache memory. The NSC may be configured to receive and to respond to cache management hints. In alternate implementations, cache management instructions may be received and processed by a different processor communicatively connected to an NSC, and appropriate cache management instructions may be transmitted from the processor to the NSC.

Figure 5:
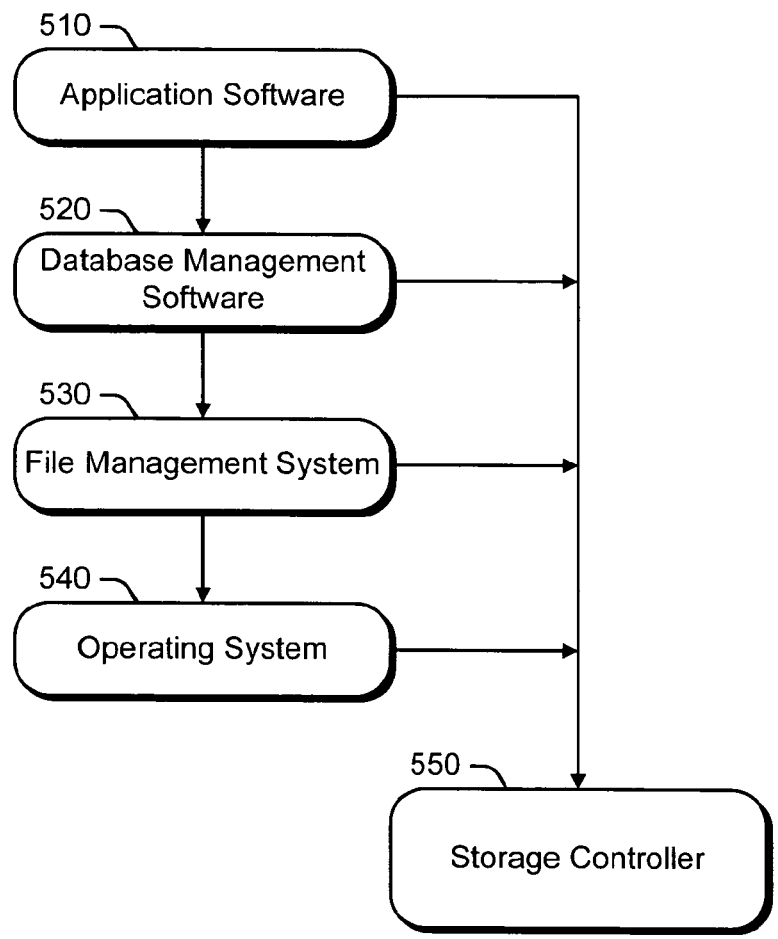
FIG. 5 is a schematic illustration of an architecture in which cache management hints are ultimately passed to a storage controller.

FIG. 5 is a schematic illustration of an architecture in which cache management hints are ultimately passed to a controller such as NSC 410a, 410b. Referring to FIG. 5, application software 510 executing, e.g., on a client computer such as client 126 interacts with database management software 520 which may be executing on one or more of the client, a server, or a host computer such as host 128. Database management software 520 typically interacts with one or more of a file management system 530 and an operating system 540 executing on one or more of a server or a host computer such as host 128, which in turn cooperates with a storage controller 550 such as, e.g., the microprocessor 416a, 416b of an NSC 410a, 410b. Each computing device involved in the transaction will have its own software and hardware stack; the components of each device are omitted for clarity.

Each module 510-540 may generate one or more cache hints, which may be transmitted directly to the storage controller 550. For example, application software 510 may generate one or more cache hints which may be transmitted directly to the storage controller 550. Similarly, one or more of the database management software 520, file management system 530 and/or operating system 550 may generate one or more cache hints which may be transmitted directly to the storage controller 550.

Alternatively, each module in the stack 500 may transmit one or more cache hints to the next module in the stack. In one embodiment the respective modules in the stack 500 pass cache hints to the next module in the stack without performing any analysis on the received cache hints. In alternate embodiments one or more of the modules 510-540 may be configured to analyze cache hints received from high-level modules in the stack and to generate a response in the event that the analysis indicates that the cache hint may cause an error.

By way of example, database management software module 520 may analyze cache hints received from one or more application modules 510 to determine whether the cache hints may invoke operations that conflict with database management software 520. Similarly, file management system module 530 may analyze cache hints received from one or more database management software modules 520 to determine whether cache hints may invoke operations that interfere with file management system module 530. Operating system 540 may analyze cache hints received from one or more file management system modules 530 to determine whether cache hints may invoke operations that interfere with operating system 540.

When one or more of the software modules 510-540 detects a conflict the software module may perform one or more remedial operations. By way of example the module may generate an error warning that may be passed back up through the stack 500 and presented to a user of the system, or to an administrator. The error warning may also be stored in a log for subsequent analysis. The module may also be configured to modify the cache hint in a fashion that reconciles a potential conflict indicated by the analysis, or to cancel the cache hint entirely.

In one embodiment storage controller 550 is configured to receive cache hints and to manage cache operations in response to the cache hints. FIGS. 6-11 are flowcharts illustrating exemplary operations for intelligent cache management that may be implemented by storage controller 550. In one embodiment, the operations illustrated in FIGS. 6-11 may be implemented as logic instructions stored in a computer-readable memory and executable on a processor such as one of the processors 416a, 416b in NSCs 410a, 410b. In alternate embodiments the operations may be embodied as firmware or may be hard-wired into an application specific integrated circuit (ASIC).

Figure 6:
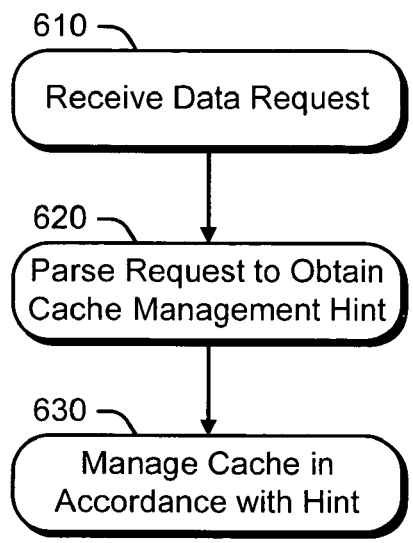
FIG. 6 is a flowchart illustrating operations in an exemplary embodiment of a method for managing cache in a storage controller.

Referring to FIG. 6, at operation 610 a storage controller 550 receives a data operation request at operation 610. At operation 620 the storage controller parses the data operation request to obtain the cache management hint associated with the data operation request. In one embodiment cache management hints may be transmitted in a header associated with the data management request, and the storage controller may be configured to retrieve the cache management hint from the header associated with the request. At operation 630 the storage controller executes one or more operations to manage cache memory resources in accordance with the cache hints associated with the data operation request.

FIGS. 7-11 are flowcharts illustrating examples of cache management hints and cache management operations associated with those hints. The specific hints illustrated in FIGS. 7-11 are intended to be illustrative rather than limiting.

Figure 7:
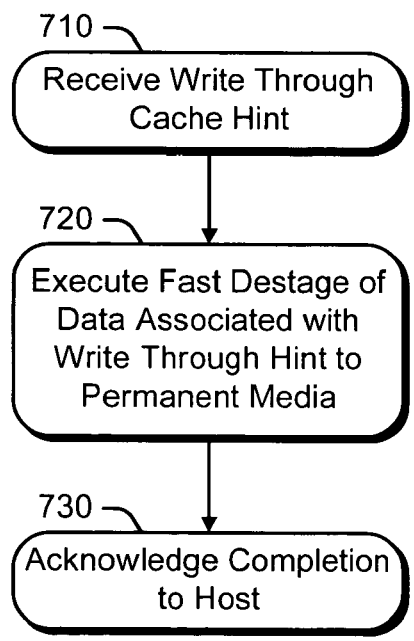
FIG. 7 is a flowchart illustrating operations associated with an exemplary embodiment of a Write-Through Cache hint.

FIG. 7 is a flowchart illustrating operations associated with a Write Through Cache hint. Referring to FIG. 7, at operation 710 the storage controller receives a Write Through Cache hint associated with a data operation. At operation 720 the storage controller executes a fast de-stage of data associated with the Write Through Cache hint to permanent media (e.g., to a disk array). After the data has been written from cache to permanent storage media, the storage controller may acknowledge execution of the write operation to the host computer that generated the data request.

In one embodiment a Write Through Cache hint may identify data associated with the operation by logical unit number (LUN). In alternate embodiments data may be identified by a logical or physical memory address associated with the data. The particular mechanism by which the data is identified is not important.

Figure 8:
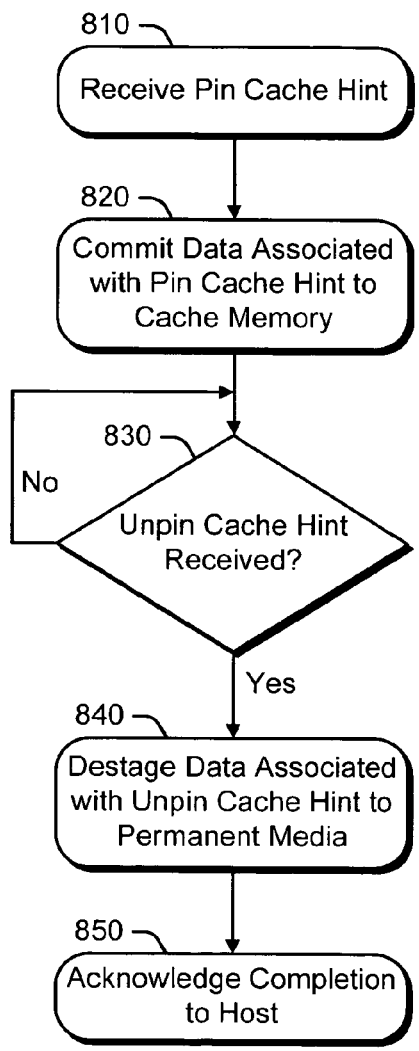
FIG. 8 is a flowchart illustrating operations associated with an exemplary embodiment of a Pin Cache hint.

FIG. 8 is a flowchart illustrating operations associated with a Pin Cache hint. At operation 810 the storage controller receives a Pin Cache hint associated with a data operation. At operation 820 the controller commits the data associated with the Pin Cache hint to cache memory. At operation 830 the controller monitors incoming data operations for an Unpin Cache hint associated with the data. The data remains "pinned" in cache until an Unpin Cache hint is received at operation 830, whereupon control passes to operation 840 and the data associated with the Unpin Cache hint is written to permanent storage media, and the write operation is acknowledged to the host (operation 850).

It is not necessary to enforce strict symmetry between the data associated with Pin Cache and Unpin Cache operations. A data block may be "pinned" to cache using a Pin Cache hint, and may be "unpinned" in a series of sub-blocks at different points in time. The storage controller may implement additional routines associated with Pin Cache hints to manage cache resources effectively. For example, a Pin Cache hint may be subject to a time threshold governed by the storage controller, so that data "pinned" to cache is automatically "unpinned" when the time threshold expires. Alternatively, the storage controller may impose a storage capacity threshold associated with "pinned" data, so that when the amount of "pinned" data exceeds a storage space threshold some or all of the pinned data is unpinned from cache.

Figure 9:
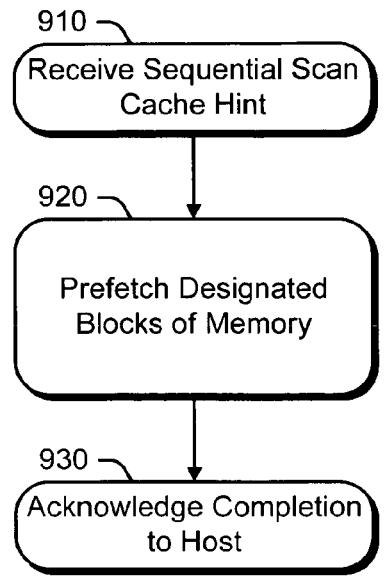
FIG. 9 is a flowchart illustrating operations associated with an exemplary embodiment of a Sequential Scan cache hint.

FIG. 9 is a flowchart illustrating operations associated with a Sequential Scan cache hint. Referring to FIG. 9, at operation 910 the storage controller receives a Sequential Scan cache hint associated with a data operation. In one embodiment the Sequential Scan operation identifies one or more blocks of data to be pre-fetched from a permanent storage media (e.g., a disk) into cache. The blocks of data may be identified by either a logical address or a physical address, as described above.

In response to the request, at operation 920, the storage controller pre-fetches the identified blocks of data from the permanent storage media and stores the data in cache memory, and returns an acknowledgment to the host computer at operation 930.

Figure 10:
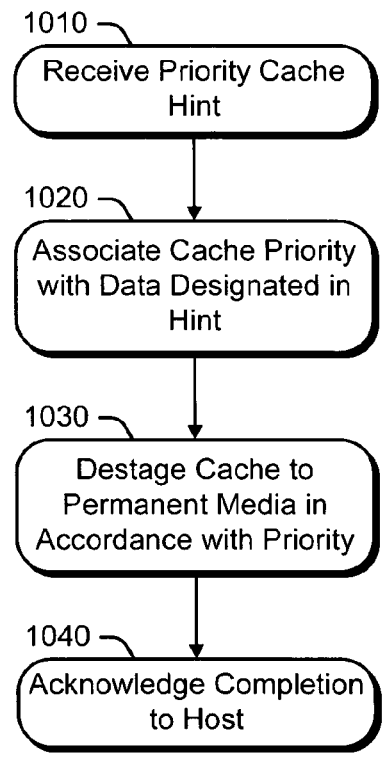
FIG. 10 is a flowchart illustrating operations associated with an exemplary embodiment of a Priority Cache hint.

FIG. 10 is a flowchart illustrating operations associated with a Priority Cache hint. Referring to FIG. 10, at operation 1010 the storage controller receives a Priority Cache hint associated with a data operation. In one embodiment, the Priority Cache hint includes a priority parameter, and at operation 1020 the priority parameter is associated with the data block identified in the cache hint. Data in the cache may be de-staged to permanent storage media in accordance with the priority parameter associated with the data (operation 1030). At operation 1040 the storage controller sends an acknowledgment to the host.

In one embodiment data blocks may be assigned numeric priority values that fall within a range of values. The storage controller may maintain a queue of data blocks that are to be de-staged to permanent storage media, and data blocks may be positioned in the queue in accordance with their respective priority values assigned. Thus, high-priority data blocks may be placed near the front of the queue, while low priority blocks may be placed near the end of the queue.

Figure 11:
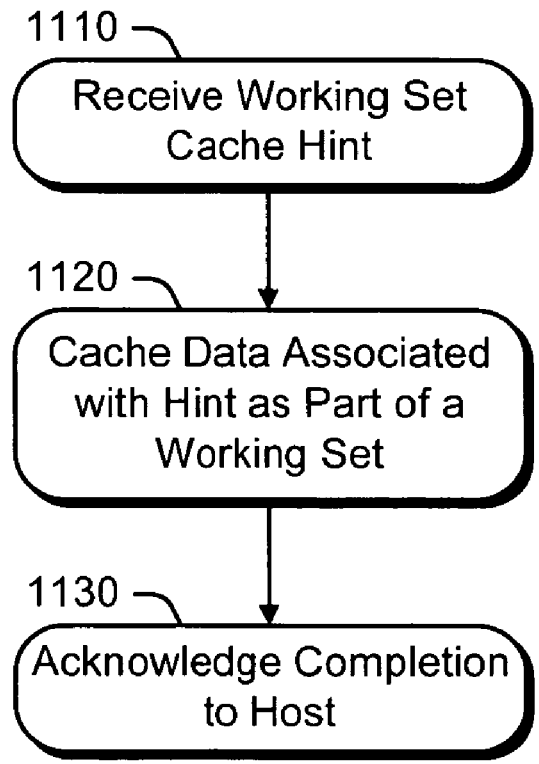
FIG. 11 is a flowchart illustrating operations associated with an exemplary embodiment of a Working Set cache hint.

FIG. 11 is a flowchart illustrating operations associated with a Working Set cache hint. A "working set" refers to set of data blocks that are accessed repeatedly by a process and therefore should be cached together, if possible. The Working Set cache hint enables an application to identify an I/O operation (i.e., a write or a read) that should be considered as belonging to a working set. In one embodiment, the Working Set cache hint identifies data blocks as belonging to a working set and to a group. For example, if database instance X is going to read three blocks (A, B, C) repeatedly as part of working set Y (e.g., iterated over repeatedly in the inner loop of a join), then the database instance may initiate a call to storage as follows: read_with_cache_hint(blocks(A,B,C), working_set_cache_hint(group(X), set(Y))).

The controller can manage multiple working sets per group, and multiple groups may access a working set.

Referring to FIG. 11, at operation 1110 the storage controller receives a Working Set cache hint. In response to the hint, at operation 1120 the storage controller caches the data blocks identified in the request in cache memory as part of a logically associated working set. At operation 1030 the storage controller sends an acknowledgment to the originating host computer.

The operations set forth in FIGS. 7-11 are examples of cache management techniques that may be implemented by a storage controller. In addition to the specific embodiments explicitly set forth herein, other aspects and embodiments of the present invention will be apparent to those skilled in the art from consideration of the specification disclosed herein. It is intended that the specification and illustrated embodiments be considered as examples only, with a true scope and spirit of the invention being indicated by the following claims.

What is claimed is:

1. A method of managing cache memory in a storage controller, comprising:
   receiving, at the storage controller, a data operation request;
   parsing the data operation request to extract a cache hint from a header in the data operation request, wherein the cache hint is generated by one of a plurality of modules in a software stack executing on a remote processor, and the cache hint identifies a memory block managed by the storage controller;
   wherein the cache hint generated by the one of the plurality of modules is selected from a group comprising a Write Through cache hint, a Pin cache hint, an Unpin cache hint, a Sequential scan cache hint, a Priority Cache hint, and a Working Set cache hint; and
   managing a cache memory operation for data associated with the memory block in response to the cache hint received by the storage controller;
   wherein the cache hint generated by a first module in the software stack is analyzed by a second module in the software stack to determine whether the cache hint conflicts with the second module.

2. The method of claim 1, wherein:
   the cache hint comprises the Write Through cache hint; and
   managing the cache memory operation comprises executing a fast de-stage operation on one or more data blocks identified in the cache hint.

3. The method of claim 1, wherein:
   the cache hint comprises the Pin cache hint; and
   managing a cache memory operation comprises holding one or more data blocks identified in the Pin cache hint until an Unpin cache hint identifying the one or more data blocks is received by the controller.

4. The method of claim 1, wherein:
the cache hint comprises the Pin cache hint; and
managing a cache memory operation comprises holding one or more data blocks identified in the Pin cache hint until a time threshold expires.

5. The method of claim 1, wherein:
the cache hint comprises the Pin cache hint; and
managing a cache memory operation comprises holding one or more data blocks identified in the Pin cache hint until a capacity threshold is reached.

6. The method of claim 1, wherein:
the cache hint comprises the Sequential Scan cache hint; and
managing a cache memory operation comprises pre-fetching from a permanent storage medium one or more data blocks identified in the Sequential Scan cache hint.

7. The method of claim 1, wherein:
the storage controller maintains a queue of data blocks for executing cache operations;
the cache hint comprises the Priority cache hint, wherein the Priority cache hint associates a priority level for cache operations associated with one or more data blocks identified in the cache hint; and
the storage controller organizes data blocks in the queue in accordance with the priority level.

8. The method of claim 1, wherein:
the storage controller maintains logical associations for working sets of data blocks for executing cache operations;
the cache hint comprises the Working Set cache hint, wherein the Working Set cache hint identifies a working set for cache operations associated with one or more data blocks identified in the cache hint; and
the storage controller manages the data blocks identified in the cache hint as part of the working set identified in the cache hint.

9. The method of claim 1, wherein the plurality of modules of the software stack comprise at least two of an application software, a database management software, a file management system, and an operating system.

10. A storage controller, comprising:
an input port to receive a data operation request from a remote computing device;
a processor; and
a memory module,
wherein the memory module comprises logic instructions which, when executed, configure the processor to:
parse the data operation request to extract a cache hint from a header in the data operation request, wherein the cache hint is generated by one of a plurality of modules in a software stack executing on a remote computing device, and the cache hint identifies a memory block managed by the storage controller;
wherein the cache hint generated by the one of the plurality of modules is selected from a group comprising a Write Through cache hint, a Pin cache hint, an Unpin cache hint, a Sequential scan cache hint, a Priority Cache hint, and a Working Set cache hint; and
manage a cache memory operation for data associated with the memory block in response to the cache hint received by the storage controller;
wherein the cache hint generated by a first module in the software stack is analyzed by a second module in the software stack to determine whether the cache hint conflicts with the second module.

11. The storage controller of claim 10, wherein:
the cache hint comprises the Write Through cache hint; and
the storage controller executes a fast de-stage operation on one or more data blocks identified in the cache hint.

12. The storage controller of claim 10, wherein:
the cache hint comprises the Pin cache hint; and
the storage controller holds one or more data blocks identified in the Pin cache hint until an Unpin cache hint identifying the one or more data blocks is received by the controller.

13. The storage controller of claim 10, wherein:
the cache hint comprises the Pin cache hint; and
the storage controller holds one or more data blocks identified in the Pin cache hint until a time threshold expires.

14. The storage controller of claim 10, wherein:
the cache hint comprises the Pin cache hint; and
the storage controller holds one or more data blocks identified in the Pin cache hint until a capacity threshold is reached.

15. The storage controller of claim 10, wherein:
the cache hint comprises the Sequential Scan cache hint; and
the storage controller pre-fetches from a permanent storage medium one or more data blocks identified in the Sequential Scan cache hint.

16. The storage controller of claim 10, wherein:
the storage controller maintains a queue of data blocks for executing cache operations;
the cache hint comprises the Priority cache hint, wherein the Priority cache hint associates a priority level for cache operations associated with one or more data blocks identified in the cache hint; and
the storage controller organizes data blocks in the queue in accordance with the priority level.

17. The storage controller of claim 10, wherein:
the storage controller maintains logical associations for working sets of data blocks for executing cache operations;
the cache hint comprises the Working Set cache hint, wherein the Working Set cache hint identifies a working set for cache operations associated with one or more data blocks identified in the cache hint; and
the storage controller manages the data blocks identified in the cache hint as part of the Working Set identified in the cache hint.

18. The storage controller of claim 10, wherein the plurality of modules of the software stack comprise at least two of an application software, a database management software, a file management system, and an operating system.

19. A storage device, comprising:
at least one disk drive;
a controller to manage data input/output operations between the disk drive and a remote processor; and
a cache memory module communicatively connected to the controller,
wherein the controller receives a data operation request and parses the data operation request to extract a cache hint from a header in the data operation request, wherein the cache hint is generated by one of a plurality of modules in a software stack executing on a remote computing device and manages data operations in the cache memory based on the cache hint received by the controller;
wherein the cache hint generated by the one of the plurality of modules is selected from a group comprising a Write Through cache hint, a Pin cache hint, an Unpin cache hint, a Sequential scan cache hint, a Priority Cache hint, and a Working Set cache hint; and wherein the cache hint generated by a first module in the software stack is analyzed by a second module in the software stack to determine whether the cache hint conflicts with the second module.

20. The storage device of claim 19, wherein:
the cache hint comprises the Write Through cache hint; and
the controller executes a fast de-stage operation on one or more data blocks identified in the cache hint.

21. The storage device of claim 19, wherein:
the cache hint comprises the Pin cache hint; and
the controller holds one or more data blocks identified in the Pin cache hint until a time threshold expires.

22. The storage device of claim 19, wherein:
the cache hint comprises the Pin cache hint; and
the controller holds one or more data blocks identified in the Pin cache hint until a capacity threshold is reached.

23. The storage device of claim 19, wherein:
the cache hint comprises the Sequential Scan cache hint; and
managing a cache memory operation comprises pre-fetching from a permanent storage medium one or more data blocks identified in the Sequential Scan cache hint.

24. The storage device of claim 19, wherein:
the storage controller maintains a queue of data blocks for executing cache operations;
the cache hint comprises the Priority cache hint, wherein the Priority cache hint associates a priority level for cache operations associated with one or more data blocks identified in the cache hint; and
the storage controller organizes data blocks in the queue in accordance with the priority level.

25. The storage device of claim 19, wherein the plurality of modules of the software stack comprise at least two of an application software, a database management software, a file management system, and an operating system.

* * * * *

UNITED STATES PATENT AND TRADEMARK OFFICE
CERTIFICATE OF CORRECTION

| | | |
|---|---|---|
| PATENT NO. | : 8,127,088 B2 | Page 1 of 1 |
| APPLICATION NO. | : 11/044962 | |
| DATED | : February 28, 2012 | |
| INVENTOR(S) | : Curt Kolovson | |

It is certified that error appears in the above-identified patent and that said Letters Patent is hereby corrected as shown below:

In the Drawings:
In Sheet 4 of 9, line 2, below "Fig. 4" delete "(Amended)".

Signed and Sealed this
Sixth Day of November, 2012

David J. Kappos
*Director of the United States Patent and Trademark Office*